United States Patent [19]

Stevens

[11] 4,397,673
[45] Aug. 9, 1983

[54] COMPOSITE CONVEYING ROLL

[75] Inventor: Stephen Stevens, Crystal City, Mo.

[73] Assignee: PPG Industries, Inc., Pittsburgh, Pa.

[21] Appl. No.: 343,049

[22] Filed: Jan. 27, 1982

[51] Int. Cl.$^3$ .............................................. C03B 25/00
[52] U.S. Cl. .................................. 65/374.11; 65/194;
65/253; 29/132
[58] Field of Search ............ 65/193, 194, 253, 374.11;
29/132

[56] References Cited

U.S. PATENT DOCUMENTS

| | | | |
|---|---|---|---|
| 2,428,344 | 9/1947 | Stookey | 263/6 |
| 3,006,625 | 10/1961 | Boron | 263/6 |
| 3,608,876 | 9/1971 | Leaich et al. | 263/6 C |
| 3,775,087 | 11/1973 | Ritter, Jr. | 65/348 |
| 3,853,525 | 12/1974 | Gorman | 65/181 |
| 3,877,919 | 4/1975 | Shorr | 65/194 |
| 4,216,005 | 8/1980 | Gladieux et al. | 65/374 R |

FOREIGN PATENT DOCUMENTS

| | | | |
|---|---|---|---|
| 701806 | 3/1931 | France | 65/193 |
| 397820 | 8/1933 | United Kingdom | 65/193 |

*Primary Examiner*—Artur D. Kellogg
*Attorney, Agent, or Firm*—Donald Carl Lepiane

[57] ABSTRACT

A glass ribbon conveying roll includes cylindrical outer tubular end portions having a plurality of high temperature thermal insulating discs secured thereon and an intermediate tubular portion. The hollow interior of the roll is filled with thermal insulating material. The thermal insulating material within the roll reduces heat transfer through the center of the ribbon and the discs prevent heat loss from the ribbon edges to maintain a relatively flat temperature profile across the ribbon as it advances through an annealing lehr.

10 Claims, 4 Drawing Figures

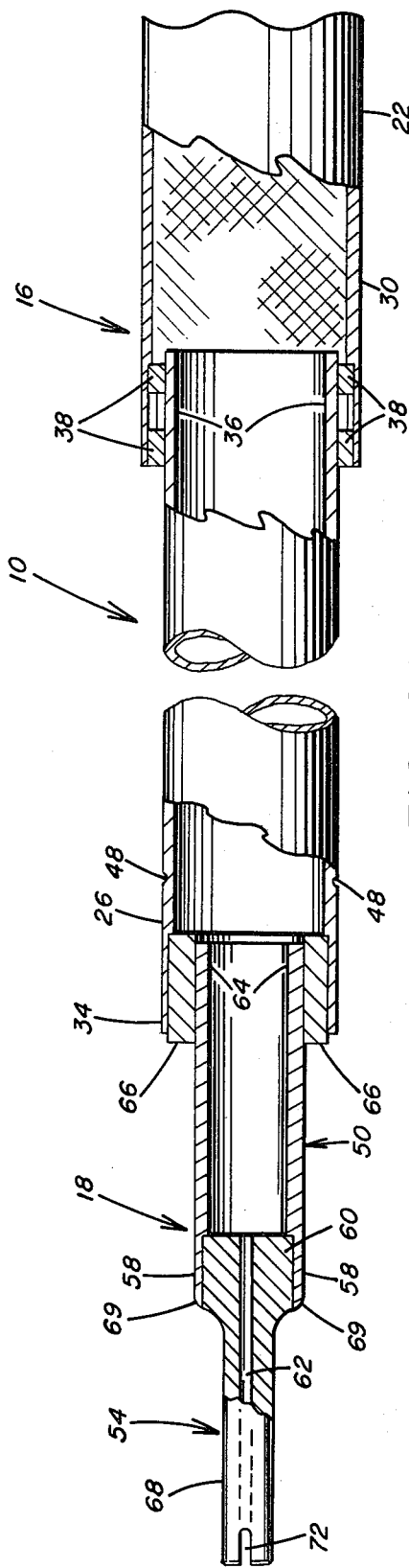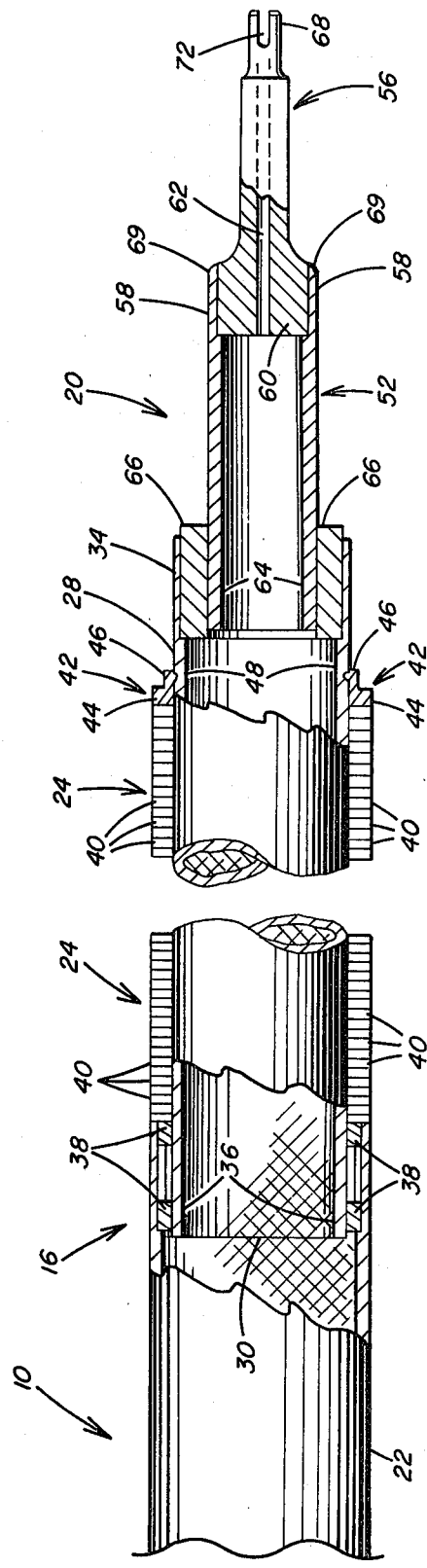
FIG. 2A
FIG. 2B

COMPOSITE CONVEYING ROLL

BACKGROUND OF THE INVENTION

1. Field of the Invention

This invention relates to conveying and supporting rolls, and more particularly, to rolls for use in glass annealing lehrs.

2. Discussion of the Presently Available Technology

Rolls for supporting and conveying sheet material at elevated temperatures are of interest in the glass industry. Of particular interest in this discussion are rolls for conveying and supporting a glass ribbon as it advances through an annealing furnace or heat treating furnace. The glass ribbon usually enters the furnace or lehr at a temperature of about 1000° F. (537.8° C.) and exits at a temperature of about 400° F. (204.4° C.).

U.S. Pat. No. 2,428,344 teaches a conveying roll, which in general, includes a metal core, an outer tubular body of refractory material surrounding and spaced from the core. Heat insulating material in the form of a hardened and set mass of cement fills the outer tubular body and bonds the core to the outer body to provide a unitary structure. Although the above roll is acceptable, there are limitations. More particularly, the roll has a unitary construction, therefore damage to any portion of the roll, e.g., surface damage to the outer tubular body and/or to the inner metal core makes the roll difficult if not impossible to repair. It would be more economical if damaged portions of the roll could be replaced.

U.S. Pat. No. 3,006,625 teaches a conveyor roll having an outer high temperature shaft and an inner water cooled shaft connected at one end by a camming device so that thermal expansion of the outer shaft moves the outer shaft longitudinally of the inner shaft in a direction away from the inter-connected end. A limitation of the preceding type roll is the use of water circulating facilities. The water tight couplings and water circulating facilities add additional expense to the cost and maintenance of the rolls.

U.S. Pat. No. 3,608,876 teaches rollers including an outer tubular ceramic member packed with insulation. A driving and supporting shaft is connected to each end of the ceramic member. A limitation of this type of roller is that any damage to the ceramic member requires replacement of the member. Although the insulation and support shafts may be reused, the replacement of the outer tubular member makes the repair of this roller economically unacceptable.

U.S. Pat. No. 3,775,087 teaches tubular conveying rolls for use in the chilling section of a sheet glass tempering apparatus. The rolls included braided sleeve coverings and the hollow interior partially filled with lead shot to dampen unwanted vibrations. Although these rolls are suitable for reducing the frequent fracture of supported glass sheets during tempering, such rolls are not usually used in a glass annealing lehr. This is because roll vibration, if any, causes little, if any, problem.

U.S. Pat. Nos. 3,853,525; 3,877,919 and 4,216,005 each teach, in one form or another, a roll for supporting and conveying a glass substrate at elevated temperatures. In general, the roll includes a plurality of asbestos discs joined together and an outer cover, e.g., of boron nitride or polyamides or the discs impregnated with a solution of potassium sulfate to provide a lubricated roll surface and retard deterioration of the discs. Although these rolls are acceptable for their intended purposes, a limitation is that the asbestos discs are not generally acceptable for health considerations. Although discs made of pressed ceramic fibers can be used in place of the asbestos discs, they do not have the durability of the asbestos discs thereby decreasing the usable life of the roll.

As can now be appreciated, it would be advantageous to provide a roll for conveying and supporting a glass substrate, in particular, a continuous glass ribbon advancing through an annealing lehr that does not have the limitations of the presently available conveying rolls.

SUMMARY OF THE INVENTION

This invention relates to a composite conveyor roll having a hollow shaft, preferably a metal shaft, including a cylindrical intermediate or central body portion having a circumference greater than the circumference of adjacent end portions. Heat insulating discs secured on the end portions have a circumference approximately equal to the circumference of the central portion. The shaft is filled with heat insulating material.

The roll of the instant invention has a central metal body portion to eliminate the problems associated with deteriorating discs such as asbestos discs and to provide a durable central body portion. The insulating material in the shaft reduces heat loss which could adversely effect the temperature profile of the glass ribbon advancing through the annealing lehr. The heat insulating discs, e.g., ceramic pressed fiber discs on the end portions of the shaft prevent convective and conductive heat loss of the ribbon edges to the environment to maintain an acceptable temperature profile at the ribbon edges as the ribbon advances through the lehr. When the discs show signs of deterioration, they are easily removed and new discs secured on the shaft end portions. In this manner, rolls of the instant invention are easily and economically maintained and/or repaired to increase their usable life.

BRIEF DESCRIPTION OF THE DRAWING

FIGS. 2a and 2b are enlarged fragmented front elevated view of the roll shown in FIG. 1 having portions removed for purposes of clarity.

DETAILED DESCRIPTION OF THE INVENTION

Figure 1:
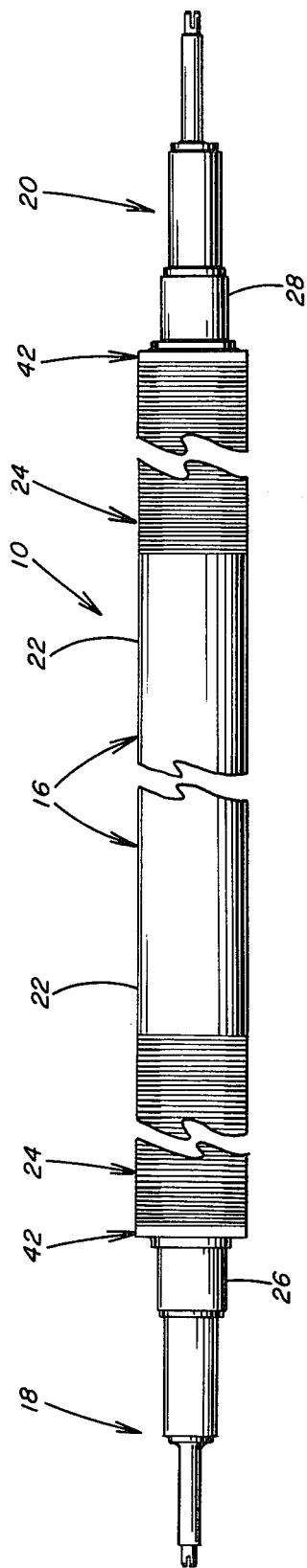
FIG. 1 is a front elevated view of a conveying roll incorporating features of the invention.
Figure 3:
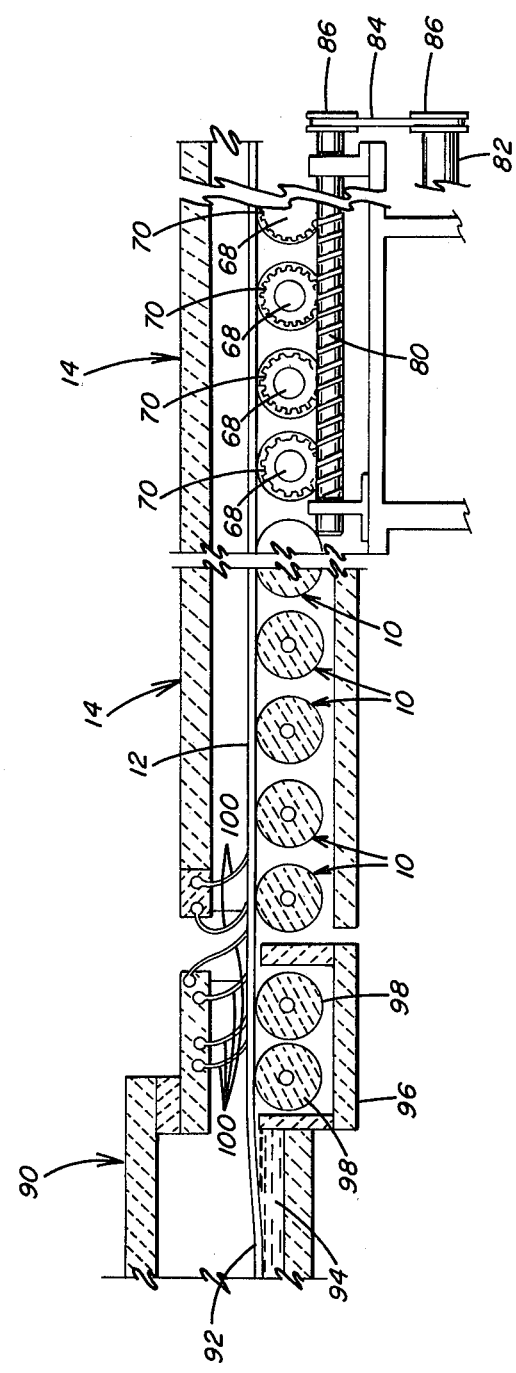
FIG. 3 is a longitudinal sectional elevated side view having portions removed for purposes of clarity of a typical take off of a float glass making apparatus and of a glass ribbon annealing lehr having rolls incorporating features of the invention.

With reference to the FIGS. 1–3, there is shown a roll 10 incorporating features of the invention for conveying and supporting articles, e.g., a glass ribbon 12 through a heat treating furnace, e.g., an annealing lehr 14 (see FIG. 3). In general, and with reference to FIGS. 1, 2A and 2B, the roll 10 includes a sheet supporting and conveying section 16 having end sections 18 and 20 connectable to driving facilities to be discussed below. The supporting and conveying section 16 includes an intermediate or central tubular portion 22 and a sleeve 24 on each end portion 26 and 28. The sleeve 24 is made of material having a low heat transfer coefficient for reasons to be discussed below. Preferably the interior of the supporting and conveying section 16 is filled with thermal insulating material 30. The insulating material 30 and sleeve 24 reduces conductive and convective heat losses to the exterior of the annealing lehr.

The supporting and conveying section 16 may include the central tubular portion 22 made of centrifically cast type 304 stainless steel having a length of about 7 feet (2.13 meters) and an outside diameter of about 1 foot (0.3 meter). The central portion 22 has a wall thickness at each end of about 0.880 inch (2.24 centimeters) for a length of 6 inches (0.15 meter) for receiving an end portion 26 or 28 in a manner to be discussed below. The remainder of the central portion 22 has a wall thickness of about 1.125 inches (2.86 centimeters).

Each of the end portions 26 and 28 are also preferably made of centrifically cast tube of type 304 stainless steel having a length of about 46.5 inches (1.18 meters) and an outside diameter of about 9.5 inches (24.13 centimeters). End 34 of each end portions 26 and 28 has a wall thickness of about ½ inch (1.27 centimeters) for a length of about 5.5 inches (13.9 centimeters) for receiving respective one of end sections 18 and 20 in a manner to be discussed below. The remainder of the end portions 26 and 28 has a wall thickness of about 1 inch (2.54 centimeters). End 36 of each end portion 26 and 28 is inserted into a respective end of the central tubular portion 22 and conveniently welded at 38 to secure the end portions 24 and 26 to the central portion 22.

As can be appreciated by those skilled in the art, the rotating axis of the end portions 26 and 28 and central portion 22 should be coincident. Further, as can now be appreciated, the supporting and conveying section 16 may be made of one piece and machined to the dimensions and shape similar to those discussed above. Still further, the shaft may be made of material other than stainless steel, e.g., chrome plated mild steel.

The sleeve 24 of insulating material mounted on each of the end portions 26 and 28 preferably would be made of a plurality of discs 40 capable of withstanding the expected elevated temperature and environment of the heat treating furnace and having a thermal insulating coefficient sufficient to minimize heat transfer to the adjacent exterior walls of the furnace. The discs 40 would have an inside diameter of about 9.5 inches (24.13 centimeters), an outside diameter of about 12 inches (0.3 meter) and a thickness of about ¼ inch (0.64 centimeter). About 40 discs would be mounted on each of the end portions 26 and 28 for a length of about 30 inches (0.762 meter) and conveniently held in position by a collar 42, e.g., a ½ inch (1.27 centimeter) thick stainless steel washer 44 slideably mounted and captured on the end portions by a circular spring tab 46 receivable in circumferential groove 48 as is shown in FIG. 2B. The groove 48 is spaced about 8½ inches (21.6 centimeters) from the end 34 of the end portions 26 and 28.

Discs that may be used in the practice of the invention are taught in U.S. Pat. Nos. 3,853,525 or 3,877,919 which teachings are hereby incorporated by reference and are preferably made of pressed ceramic fibers, e.g., of the type sold by New Hudson Corporation as Firefly 800 refractory fibers; by Pyrotec, Inc., as Pyrotech U2 or Pyrotherm Board Type U-1 refractory fibers; or by Carborundum Corp. as Duroboard 60 refractory fibers.

The end sections 18 and 20 include a tube member 50 and 52 and a shaft support 54 and 56 respectively. Each of the tube members 50 and 52 are preferably made of stainless steel tubing having a length of about 20 inches (0.5 meter) and an outside diameter of about 5.5 inches (13.97 centimeters). The tube members 50 and 52 each have a wall thickness of about 0.250 inch (0.64 centimeter) at end 58 for a length of about 3.5 inches (8.89 centimeters) and a wall thickness of about 0.5 inch (1.27 centimeters) for the remainder of its length. The shaft supports 54 and 56 are each made of stainless steel with the shaft support 54 having a length of about 17.5 inches (44.45 centimeters) and the shaft support 56 having a length of about 19 inches (48.26 centimeters) for supporting drive facilities to be discussed below. End 60 of each shaft support 54 and 56 has an outside diameter of about 5½ inches (13.34 centimeters) for a length of 4 inches (10.16 centimeters) and thereafter necks down to a diameter of about 2.5 inches (6.35 centimeters) which is maintained to the opposite end for the shaft support 54. As for the shaft support 56, its end necks down to a diameter of about 2.5 inches (6.35 centimeters) for a length of about 9 inches and thereafter necks down to a diameter of about 1.5 inches to its end. A passageway 62 extends through each of the shaft supports 54 and 56 to prevent pressure build up in the roll 10. Each shaft end has a ⅝ inch by 5/16 inch (1.58 centimeter by 0.79 centimeter) keyway 72 for positively driving the roll in a manner discussed below. Although the shaft supports are preferably made of stainless steel, it can now be appreciated that the invention is not limited thereto and the shafts may be of any metal, e.g., mild steel.

Although not limiting to the invention, the roll may be fabricated in the following manner. A tube of insulating material, e.g., loose ceramic or refractory fibers, is packed into the center portion 22 afterwhich the end 36 of the end portions 26 and 28 is inserted in respective end of the center portion 22 for a length of about 6½ inches (16.51 centimeters). With the longitudinal axis of the end portions 26 and 28 and of the center portion 22 coincident, the end portions 36 are welded at 38. Insulating material is packed into the end portions 26 and 28. End 64 of each tube member 50 and 52 is inserted in the end 34 of respective one of the end portions 26 and 28 for a length of about 5.5 inches (13.97 centimeters) and welded in position 66. The end 60 of the shaft supports 54 and 56 are mounted and press fitted into the end 58 of respective one of the shaft supports 54 and 56 and welded at 69. The longitudinal axis of each member making up of the roll 10 is preferably coincident with one another to rotate about a concentric axis. If needed, the assembled roll 10 may be machined to correct for non-concentricity.

Discs 40 made of pressed refractory fibers, e.g., of the type sold by New Hudson Corporation as Firefly 800 refractory fibers, having an outside diameter greater than 1 foot (0.3 meter) and an inside diameter of about 9.5 inches (24.13 centimeters) are mounted and secured in position by the collar 42. Thereafter, the roll is rotated and machined to provide a glass supporting surface that has a uniform diameter and is concentric about the longitudinal rotating axis of the roll 10.

Referring now to FIG. 3, the rolls 10 are conveniently mounted to the lehr 14, e.g., by mounting the rolls 10 in the lehr with end 68 of the shaft supports 54 and 56 extending through the wall of the lehr 4 and mounted in bearing blocks (not shown). A gear wheel 70 is secured on a shaft end 68 keyway 72. A worm gear 80 rotatably mounted exterior of the lehr 14 is powered by motor 82 through endless belt 84 and pulleys 86 to positively drive the rolls 10 to advance the glass ribbon 12 through the lehr 14.

With continued reference to FIG. 3, there is shown a longitudinal section of a portion of a typical glass producing furnace 90 which may be of the type taught in U.S. Pat. No. 3,843,346, which teachings are hereby incorporated by reference. In general, molten glass 92 is supported on a bath 94 of molten metal. The glass 92, as it travels through the chamber 90 is cooled to the glass ribbon 12 and removed at the exit end 96 by lift out rolls 98. The ribbon 12 is further advanced through the annealing lehr 14 on the conveyor rolls 10 incorporating features of the invention, where glass ribbon temperature is controlled to release permanent stress and strain in the glass ribbon 12. Protective reduction atmosphere such as nitrogen with a small percentage of hydrogen, is maintained within the chamber 90 while permitting the passage of the glass ribbon 12 by a series of curtains or drapes 100 which trail on the glass ribbon. Drapes or curtains 100 are also provided at the entrance end of the lehr 14.

As the glass ribbon advances on the rolls 10, heat loss through the metal center tubular portion 22 is minimized by the insulating material 30. Heat loss from the ribbon edges is minimized by the discs 40 which have a heat loss coefficient less than the heat loss coefficient of the metal central portion. In this manner, the temperature profile across the ribbon is generally flat.

As can now be appreciated, the above example is presented for illustration purposes only and is not limiting to the invention.

What is claimed is:

1. A conveyor roll for transporting material comprising:
    a cylindrical, intermediate portion including an exterior surface portion wherein said exterior surface portion is formed of a material having a heat transfer coefficient and a circumference;
    an end portion mounted on each end of said intermediate portion, said end portions including:
        a body portion having perimeter less than said circumference; and
        at least one thermally insulating disc mounted on said body portion wherein said disc is formed of a material having a heat transfer coefficient less than the heat transfer coefficient of said intermediate portion to provide a roll having heat transfer properties such that heat transfer between said intermediate portion and the material to be transported is greater than the heat transfer between said end portions and the material to be transported; and
    means for securing said disc on its respective body portion.

2. The conveyor roll as set forth in claim 1 wherein said exterior surface portion of said intermediate portion is metal.

3. The conveyor roll as set forth in claim 2 wherein said at least one disc includes a plurality of said discs mounted on each of said body portions, and
    said plurality of discs defines a circumference substantially equal to said circumference of said intermediate portion.

4. The conveyor roll as set forth in claim 3 wherein said intermediate portion is hollow and further including thermal insulating material in said intermediate portion.

5. The conveyor roll as set forth in claim 4 wherein said body portions are hollow and further including thermal insulating material in said body portions.

6. The conveyor roll as set forth in claim 5 wherein said discs are made of pressed refractory fibers.

7. A conveyor roll as set forth in claim 6 wherein said intermediate portion and body portions are made of metal.

8. The conveyor roll as set forth in claim 7 wherein said securing means includes a collar having a spring tab receivable in a groove in said body portions to bias said discs on said body portions toward said intermediate portion.

9. The conveyor roll as set forth in claim 8 further including means for rotatably mounting the roll in a glass annealing lehr.

10. The conveyor roll as set forth in claim 7, wherein said roll is mounted for conveying material along a generally horizontal path.

* * * * *